US012360281B2

(12) United States Patent
Kair et al.

(10) Patent No.: US 12,360,281 B2
(45) Date of Patent: *Jul. 15, 2025

(54) TRANSPORTATION SECURITY APPARATUS, SYSTEM, AND METHOD TO ANALYZE IMAGES TO DETECT A THREAT CONDITION

(71) Applicant: CHERTOFF GROUP, LLC, Washington, DC (US)

(72) Inventors: Lee Kair, Fairfax, VA (US); Bennet Waters, Durham, NC (US)

(73) Assignee: CHERTOFF GROUP, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,473

(22) Filed: Dec. 15, 2023

(65) Prior Publication Data

US 2024/0248233 A1 Jul. 25, 2024

Related U.S. Application Data

(63) Continuation of application No. 17/744,507, filed on May 13, 2022, now Pat. No. 11,846,746, which is a (Continued)

(51) Int. Cl.
*G01V 5/20* (2024.01)
*G06F 21/57* (2013.01)
(Continued)

(52) U.S. Cl.
CPC ............ *G01V 5/271* (2024.01); *G06F 21/577* (2013.01); *G06N 20/00* (2019.01); *G06V 20/52* (2022.01);
(Continued)

(58) Field of Classification Search
CPC .... G06N 20/00; G06V 20/52; H04L 63/1408; H04L 67/12
See application file for complete search history.

(56) References Cited

U.S. PATENT DOCUMENTS 6,707,879 B2  3/2004  McClelland et al.
7,193,515 B1  3/2007  Roberts et al.
(Continued)

FOREIGN PATENT DOCUMENTS

WO    2018/023190 A1    2/2018

OTHER PUBLICATIONS

International Search Report and Written Opinion of the International Searching Authority issued on Sep. 17, 2019 in PCT/US2019/037942.

*Primary Examiner* — Beemnet W Dada
(74) *Attorney, Agent, or Firm* — TUCKER ELLIS LLP; J. Derek Mason (57) ABSTRACT

In a transportation security technique, images are stored that are received from image capturing equipment deployed at respective screening nodes. The images are analyzed using a machine learning model, where presence of a particular object in an image indicates that a threat condition exists at the screening node. The analyzed images are transmitted to threat assessment components in accordance with predetermined criteria. An indication that the particular object is observed in the image is received from the threat assessment components. An indication that the particular object is observed in the image is transmitted to the screening node responsive to receiving the indication that the particular object is observed in the image. An indication of whether the particular object is present at the screening node is received.

(Continued)

The machine learning model is trained based on the received indication of whether the particular object is observed in the image.

20 Claims, 6 Drawing Sheets

Related U.S. Application Data continuation of application No. 16/446,035, filed on Jun. 19, 2019, now Pat. No. 11,336,674.

(60) Provisional application No. 62/687,432, filed on Jun. 20, 2018.

(51) Int. Cl.
*G06N 20/00* (2019.01)
*G06V 20/52* (2022.01)
*H04L 9/40* (2022.01)

(52) U.S. Cl.
CPC ...... *H04L 63/1408* (2013.01); *H04L 63/1433* (2013.01); *H04L 63/1441* (2013.01); *H04L 63/20* (2013.01)

(56) References Cited

U.S. PATENT DOCUMENTS

| | | | |
|---|---|---|---|
| 9,014,425 | B2 | 4/2015 | Perron |
| 9,094,580 | B2 | 7/2015 | Song et al. |
| 9,245,175 | B1 | 1/2016 | Vladimir et al. |
| 9,773,173 | B2 | 9/2017 | Perron |
| 10,275,660 | B2 | 4/2019 | Perron |
| 11,336,674 | B2 * | 5/2022 | Kair .................. H04L 63/1408 |
| 11,846,746 | B2 * | 12/2023 | Kair .................. H04L 63/1441 |
| 2008/0005804 | A1 | 1/2008 | Rodriguez et al. |
| 2009/0231134 | A1 | 9/2009 | Modica et al. |
| 2012/0243741 | A1 | 9/2012 | Shet et al. |
| 2014/0028457 | A1 | 1/2014 | Reinpoldt et al. |
| 2014/0189048 | A1 | 7/2014 | Messinger et al. |
| 2015/0186732 | A1 | 7/2015 | Perron |
| 2017/0111497 | A1 | 4/2017 | Starr |
| 2017/0357857 | A1 | 12/2017 | Perron |

* cited by examiner

TRANSPORTATION SECURITY APPARATUS, SYSTEM, AND METHOD TO ANALYZE IMAGES TO DETECT A THREAT CONDITION

RELATED APPLICATION DATA

This application is a continuation of U.S. Ser. No. 17/744,507, filed May 13, 2022, which is a continuation of U.S. Ser. No. 16/446,035, filed Jun. 19, 2019, which claims priority under 35 U.S.C. § 119(c) from U.S. Provisional Patent Application No. 62/687,432 entitled "Transportation Security," filed Jun. 20, 2018, the entire contents of each of these applications is incorporated herein by reference.

BACKGROUND

The need for aviation security emerged shortly after the dawn of commercial flight. The mid-1900s saw an uptick in aircraft hijackings by individuals seeking expeditious political asylum, while the late-1900s saw the advent of terrorist-perpetrated aircraft bombings. Increased threat-actor interest in commercial aircraft as high-visibility attack targets coincided with the development and proliferation of electronic surveillance and inspection systems, ushering in a new era of aviation security. The processes and technologies implemented to meet the needs of the $20^{th}$-century aviation threat landscape, however, proved insufficient to deter or detect $21^{st}$-century terrorists' intended use of aircraft as weapons in themselves. The Sep. 11, 2001 attacks on New York and Washington opened yet a new chapter in aviation security, one characterized by integrated human and technological solutions.

Despite shifts in the aviation security threat landscape, the screening process for accessible property—better known as carry-on baggage—remains largely unchanged since its implementation to combat aircraft hijackings in the 1960s. The process requires X-ray operators to inspect images of passenger baggage for signs of explosives or other prohibited items, and to divert bags with identified potential threats for secondary manual inspection. As implemented, the current system operates with approximately 50-80% efficiency with X-ray operators experiencing an estimated 20-50% idle time depending on passenger load at the checkpoint. Of more concern is that the system lacks a real-time mechanism for delivering feedback to officers on the accuracy of their threat detection, and no database captures these critical performance metrics.

The evolving aviation threat environment requires the aviation security community—the Transportation Security Administration (TSA) and similar organizations around the world responsible for ensuring the security of the traveling public—to develop innovative models for speeding the deployment of best-in-class technologies capable of detecting emerging threats at the checkpoint.

SUMMARY

In a transportation security technique, images are stored in a memory, where the images are received from image capturing equipment deployed at respective screening nodes. The screening nodes are communicatively coupled to a processor through a communications network. The stored images are analyzed using a machine learning model to identify objects therein, where presence of a particular such object in an image is indicative of a threat condition at the screening node at which the image was captured. The analyzed images are transmitted to threat assessment components, which may be operated by a human analyst or by machine learning logic, in accordance with operator selection criteria, where the threat assessment components are communicatively coupled to the processor through the communications network. An indication that the particular object is observed in the image is received from the threat assessment components. An indication that the particular object is observed in the image is transmitted to the screening node at which the image was captured in response to receiving the indication that the particular object is observed in the image. An indication of whether the particular object is present at the screening node is received. The machine learning model is trained based on the received indication of whether the particular object is observed in the image.

DETAILED DESCRIPTION

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

The present disclosure describes the current accessible property screening process, articulates a revised approach to airport X-ray screening designed to increase detection efficiency and significantly improve screening capabilities, and identifies two methods for quickly procuring, sustaining, and operating checkpoint X-ray equipment in the future.

Figure 1:
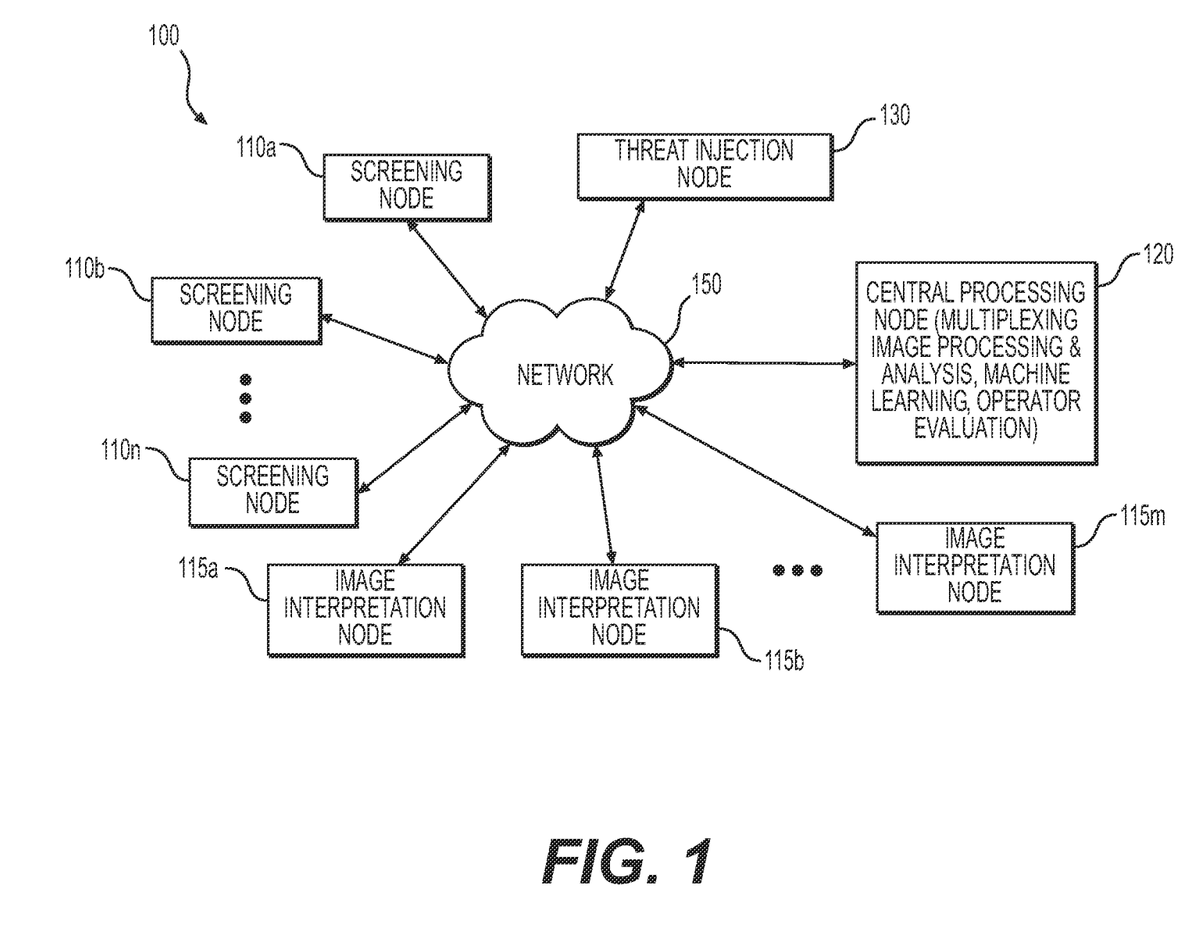
FIG. 1 is a schematic block diagram of a system in which the present invention can be embodied.

FIG. 1 is a schematic block diagram of a system 100 in which the present invention can be embodied. System 100 may include a plurality of screening nodes 110a-110n, representatively referred to herein as screening node(s) 100, comprising equipment by which images of objects under consideration are acquired. Such images may be produced by x-ray, computed tomography (CT) and other equipment by which interior chambers of passenger property are imaged. The acquired images may be provided, via network 150, to a suitable central processing node 120, which, as will be described below, performs multiplexing, image processing and analysis, machine learning, operator evaluations, among other things. The processed image data may be provided to image interpretation nodes 115a-115m, representatively referred to herein as image interpretation node(s) 115, where the image data are analyzed to assess whether the objects under consideration, as depicted in the image data, pose a threat or do not pose a threat. The image interpretation nodes 110, in response to the threat assessment, routes the items under consideration to an appropriate destination for further processing, e.g., further inspection or return to customer. Meanwhile, during the normal stream of commerce, operations evaluation circuitry at central processing node 120 may perform several functions by which system 100 is provided feedback. For example, operations evaluation circuitry may include mechanisms by which performance of individual operators are evaluated.

As illustrated in FIG. 1, system 100 may include a threat injection node 130 (also referred to herein as a covert node) comprising threat injection lab equipment at which actual threats are created under controlled conditions. Images of items of interest containing such actual threats are inserted into the stream of commerce images. These and other features of the present invention are discussed below.

System 100 may be implemented in a client-server system, database system, virtual desktop system, distributed computer system, cloud-based system, clustered database, data center, storage area network (SAN), or in any other suitable system, for example in a system designed for the provision of Software-as-a-Service (SaaS), such as a cloud data center or hosted web service.

Figure 2:
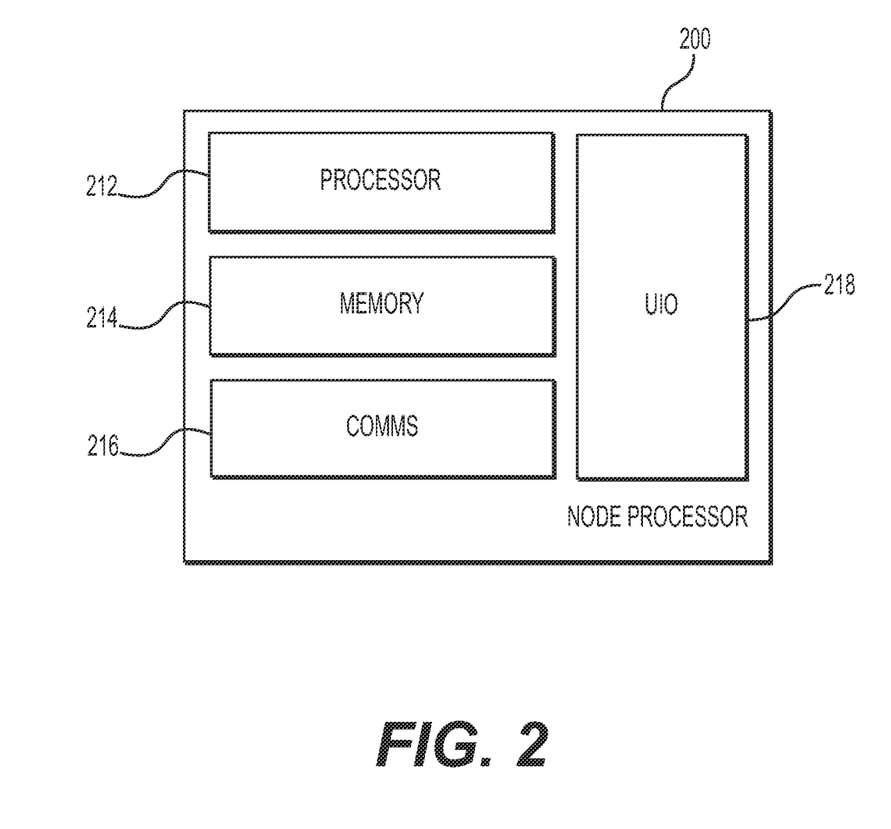
FIG. 2 is a block diagram of an example node processor that may be used in conjunction with embodiments of the present invention.

FIG. 2 is a block diagram of an example node processor that may be used in conjunction with embodiments of the present invention. As FIG. 1 suggests, system 100 may be viewed as a set of interoperating nodes interconnected through network 150. At their core, such nodes may include a node processor 200, which may include processor circuitry 212, memory circuitry 214, communications circuitry 216 and user input/output circuitry 218.

Processor circuitry 212 may be, for example, one or more data processing devices such as microprocessors, microcontrollers, systems on a chip (SOCs), or other fixed or programmable logic, that executes instructions for process logic stored in memory circuitry 214. The processors may themselves be multi-processors, and have multiple CPUs, multiple cores, multiple dies comprising multiple processors, etc.

Memory circuitry 214 may be implemented by any quantity of any type of memory or storage device, and may be volatile (e.g., RAM, cache, flash, etc.), or non-volatile (e.g., ROM, hard-disk, optical storage, etc.), and include any suitable storage capacity.

Communications circuitry 216 represents any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the system may include any communications device to communicate over network 150 via any protocol, and may utilize any type of connection (e.g., wired, wireless, etc.) for access to the network User I/O interface 218 enables communication between a display device, input device(s), and output device(s), and the other components, and may enable communication with these devices in any suitable fashion, e.g., via a wired or wireless connection. The display device (not illustrated) may be any suitable display, screen or monitor capable of displaying information to a user, for example the screen of a tablet or the monitor attached to a computer workstation. Input device(s) (not illustrated) may include any suitable input device, for example, a keyboard, mouse, trackpad, touch input tablet, touch screen, camera, microphone, remote control, speech synthesizer, or the like. Output device(s) (not illustrated) may include any suitable output device, for example, a speaker, headphone, sound output port, baggage handling equipment, or the like. The display device, input device(s) and output device(s) may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

Figure 3:
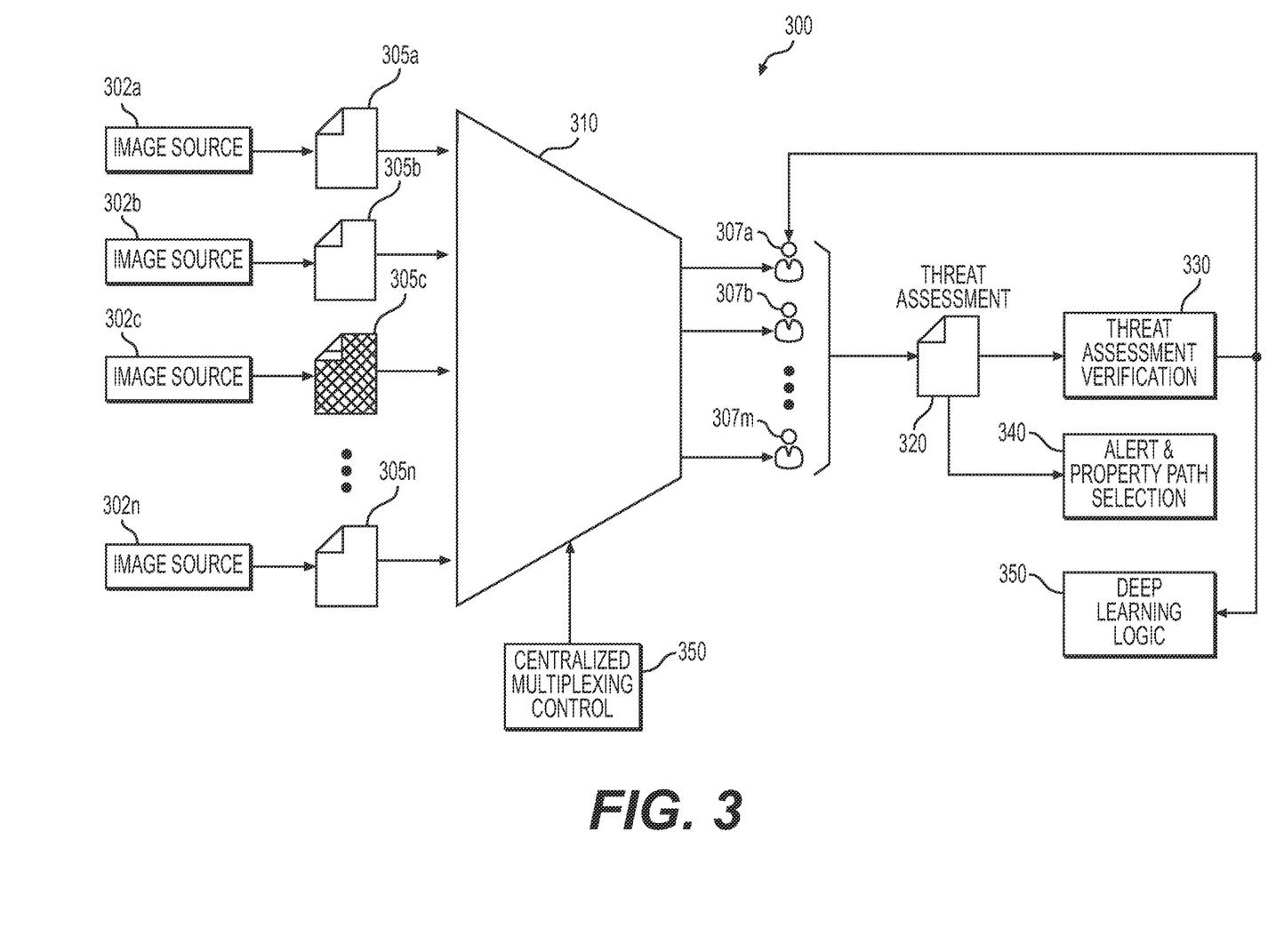
FIG. 3 is a conceptual block diagram of a transportation security apparatus by which the present invention can be embodied.

FIG. 3 is a conceptual block diagram of a transportation security apparatus 300 by which the present invention can be embodied. Central to the concept is massive multiplexing, representatively illustrated by multiplexer 310, by which images 305a-305n, representatively referred to herein as image(s) 305, are assigned to respective analysts 307a-307m, representatively referred to herein as analyst(s) 307, for determining whether a threat exists in passenger property depicted in images 305. Images 305 may be generated by different image sources 302a-302n, representatively referred to herein as image source(s) 302, at a rate of hundreds to hundreds of thousands of images per hour. Image sources 302 may be widely distributed geographically, as may analysts 307. Each image 305 is assigned to an analyst 307 by way of a centralized multiplexing control 350, which is aware of all image sources 302 and all analysts 307 in apparatus 300. It is to be understood that while a single multiplexer 310 is illustrated in FIG. 3, more than one such multiplexer 310 may be realized in embodiments of the present invention. For example, multiplexer 310 may be constructed or otherwise configured for regional deployment, where each region has its own multiplexing mechanism. Each regional multiplexer 310 may be controlled by centralized multiplexing control 350, which may also be regionally deployed, i.e., supporting a particular region. Moreover, multiple multiplexing mechanisms may be used to realize system redundancy such that when one mechanism should fail or otherwise be taken offline, other multiplexing mechanisms may take its place.

As illustrated in FIG. 3, each analyst 307 produces a threat assessment 320 based on what is depicted in the correspondingly assigned image 305. Such threat assessment may indicate whether a threat is present or is not present in the property from which the image is generated. Threat assessment 320 may be provided to an alert and property path selection component 340 that alerts security officers at the location of the property and establishes the destination of the property, e.g., it can be returned to the passenger if no threat is found or may be routed to a trained security officer for further scrutiny if a threat is observed. Additionally, threat assessment 320 may be provided to threat assessment verification 330, which may be performed by the aforementioned security officer when a threat has been noted, but may be performed on selected threat assessments regardless of whether a threat is posed. The threat assessment verification may be provided as feedback to analysts 307 and/or to deep learning logic 350, such as for purposes of training.

In certain embodiments, analysts 307 are human operators, also referred to herein as image interpretation officers (IIOs). When so embodied, the aforementioned feedback may be provided to relevant operators as well as managerial personnel responsible for operator training. In other embodiments, analysts 307 comprise one or more machine components that generate threat assessments 320 based on machine learning. When so embodied, the aforementioned feedback may be used for training machine learning models, as will be appreciated and understood by those skilled in machine learning. In still other embodiments, human operators and machine learning are deployed in tandem, so as to allow, for example, phasing in of automated analysis over time.

In certain embodiments, one or more image sources 302, e.g., image source 302c, may provide images, e.g., image 305c, that are of property containing actual threat positive items (explosives, for example). Image 305c is provided to the massive multiplexing process without a distinction that would be recognizable to analysts 307. That is, image 305c is inserted into the normal image analysis stream as would be any other image; analysts would not be able to identify the image as coming from a special image source 302, i.e., image source 302c.

The images may have associated metadata that, among other things, identify the screening location at which an image was captured and the passenger to which the property belongs.

Figure 4:
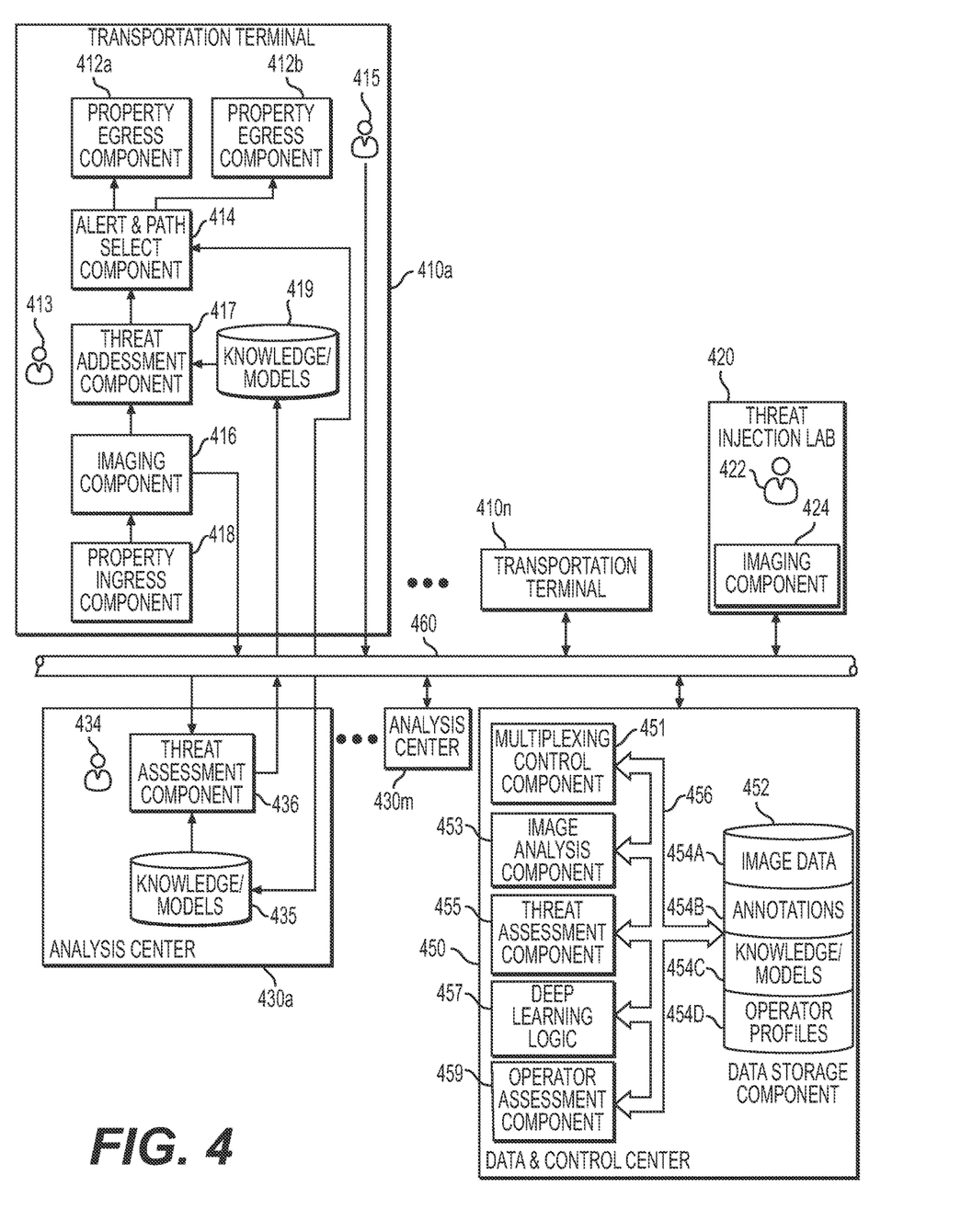
FIG. 4 is a schematic block diagram of an example transportation security system by which the present invention can be embodied.

FIG. 4 is a schematic block diagram of an example transportation security system 400 by which the present invention can be embodied. Transportation security system 400 may be implemented on system 100 illustrated in FIG. 1 and may comprise equipment deployed at transportation terminals 410a-410n, representatively referred to herein as transportation terminal(s) 410, equipment deployed at analysis centers 430a-430m, representatively referred to herein as analysis center(s) 430, equipment deployed at a threat injection lab 420 and equipment deployed a data and control center 450. The equipment deployed at these various facilities may be communicatively coupled via one or more communication channels, representatively illustrated in FIG. 4 as data transport component 460, realized in network 150 of FIG. 1. Upon review of this disclosure, those having skill in telecommunications will appreciate how data transport component 460 can be embodied so as to convey large image data files and other information and control data in an efficient manner. The present invention is not limited to particular data transport techniques.

Transportation terminals 410 may have deployed thereat one or more screening mechanisms 405, each comprising a property ingress component 418, by which passenger property is introduced into the screening process, an imaging component 416, by which images of the passenger property are obtained, a threat assessment component 417, by which the images are scrutinized for threats, path select component 414, by which the passenger property is selectively transported to one of a plurality of property egress components 412a and 412b, representatively referred to herein as property egress component(s) 412. Each of property egress components 412 may be a destination for property that meets separate security risk criteria. For example, property egress component 412a may be the target destination of property to be returned directly to the passenger, while property egress component 412b may be the target destination of property that is to receive further scrutiny by a security officer. In certain embodiments, screening mechanisms 405 may be implemented by automated screening lanes (ASLs) known to those skilled in transportation security. Imaging component 416 may include Computed Tomography (CT) or X-Ray Diffraction (XRD) screening equipment.

Analysis centers 430 may have deployed thereat a threat assessment component 436 by which an operator 434 analyzes images to determine whether a threat exists in the corresponding property. In certain embodiments, threat assessment is carried out in the mind of the operator 434, in which case threat assessment component 436 may be a display device on which a suitable user interface may be realized. Such a user interface may allow operator 434 to fully scrutinize the presented image for suspicious items and to indicate whether an object depicted poses a threat. The present invention is not limited to particular user interface implementations.

Data and control center 450 may have deployed thereat a multiplexing control component 451, an image analysis component 453, a threat assessment component 455, deep learning logic 457, an operator assessment component 459 and a data storage component 452 interconnected one with the others over a suitable communication component 456. Communication component 456 may be realized by network connections, intra-processor messaging, physical processor busses, etc. In certain embodiments, data and control center 450 is implemented in server circuitry suitable for cloud computing.

Example data storage component 452 provides centralized, persistent storage for various data utilized throughout transportation security system 400. In the example illustrated, data storage component 452 stores image data 454a, which are the images produced by imaging components 416 at transportation terminals 410 and imaging component 424 at threat injection lab 424. Annotations 454b are metadata associated with image data 454a that identify different regions and/or objects therein. Knowledge/models 454c comprise knowledgebase and neural network model data by which images are analyzed and threat assessments are made. Analyst profiles 454d contain information regarding the human operators 434 (image interpretation officers) including credentials and ratings.

Multiplexing control component 451 may be constructed or otherwise configured to distribute images to different operators 434 at analysis centers 430 from a central location. Each incoming image may have an associated identifier and each operator 434 may likewise have an associated identifier. Multiplexing control component 451 may associate the incoming image identifier with an operator identifier and may convey the corresponding processed image (by image analysis component 453, as described below) to the network address of the threat assessment component 436 at which the identified operator 434 has logged in. The association of image to operator may be randomly selected or may be selected according to predetermined selection criteria. For example, in one implementation, multiplexing control component 451 may realize a load balancing technique by which operators 434 are assigned a similar amount of work. Such load balancing may also consider network congestion, network outages, operator scheduling, training and breaks, and so on. The association of image to operator may also be selected based on subject matter expertise and other known operator talents, certifications, etc. Such association of images to subject matter experts may be beneficial in training machine learning models. For example, when machine learning is being trained to make threat decisions, as described below, subject matter experts may be employed to verify whether images depict threats and whether the images do not depict threats.

Image analysis component 453 may be constructed or otherwise configured to identify objects in incoming images. For example, images captured by imaging components 416 at transportation terminals 410 may undergo edge detection, image segmentation, feature extraction, object classification, etc. by which items in the imaged property can be identified and assessed for threats. In certain embodiments, different objects may be outlined or otherwise highlighted in the image, with particular objects, i.e., those objects posing a threat, being conspicuously portrayed in the image. Such image processing may be achieved by techniques used for x-ray and/or computed tomography images.

Threat assessment components 417 and 455 differ from threat assessment component 436 in that threat assessment components 417 and 455 identify the presence or the non-presence of a threat by machine processes as opposed to by human cognition.

Image analysis component 453 and threat assessment components 417, 436 and 455 may operate on machine learning principles, which are representatively illustrated as deep learning logic 457. For example, embodiments of the invention may utilize a convolutional neural network (CNN) that has image data as its input layer, an indication of "threat" or "no-threat" at its output layer and various image processing and threat detection operations being performed by inner, hidden layers. This configuration represents the combination of image analysis component 453, threat assessment component 455 and deep learning logic 457. In earlier stages of deployment, however, actual threat decisions are left to human operators 434 at analysis centers 420. To facilitate such, embodiments of the invention may utilize a CNN that has image data as its input layer, annotations of various objects represented in the image data at its output layer and various image processing operations being performed by inner, hidden layers. This configuration represents a combination of image analysis component 453 and deep learning logic 457, with threat detection being performed at threat assessment component 436 at analysis centers 420 or at threat assessment component 417 at transportation terminals 410. Thus, while deep learning logic 457, image analysis component 453, and threat assessment components 417, 436 and 455 are illustrated in FIG. 4 as separate components, such is for descriptive purposes only and not necessarily implemented in all embodiments. Nevertheless, certain compartmentalization of functionality is believed beneficial, such as in phased deployments where, in a first phase of deployment human operators 434 make threat decisions at threat assessment components 436 and, in a later phase of deployment, e.g., after deep learning logic 457 has been suitably trained, threat decisions are made by machine operations performed at threat assessment component 455.

Training of CNNs may be achieved using known training sets for transportation security imagery. Feedback may be employed as well with images corresponding to verified threats being used to expand the training set. That is, as images are identified as containing threats and are verified by 1) security officers at the location of the property and 2) known threat positive images from threat injection lab 420, they are inserted into the CNN training process.

Operator assessment component 459 may also receive feedback from verified images of threats. There are two basic elements of operator performance management, use of stream of commerce bags and use of images created in the covert node. In the stream of commerce case, the "threat" and "no threat" determinations made by operators 434 and deep learning logic 457, and the "confirmed threat" and "confirmed no-threat" determination by the bag search officer, e.g., security officer 415, at the local transit facility, allow the measurement of actual performance of individual operators 434, the effectiveness of deep learning logic 457, and the overall detection rate for image interpretation of the overall transportation system at any given time.

In the covert node case (described below with reference to threat injection lab 420): As new threats to transportation security are determined through intelligence, or system vulnerabilities are discovered through covert testing, the covert node will build actual threat items (bombs, for example) to determine the effectiveness of operators 434 and deep learning logic 457 to detect these threats. Where there are deficiencies, all operators 434 who missed the item can be remediated through re-training, and software engineers will further enhance the capabilities of deep learning logic 457. Threat injection lab 420 may operate at a high frequency (many builds per day) and additionally include minor variations of known difficult configurations.

Government agencies typically refer to X-ray security effectiveness in terms of probability of detection ($P_d$) and probability of false alarm ($P_{fa}$). Typically, these rates are based on statistical analysis of laboratory-based testing and extrapolated to the aggregate. Probability of detection $P_d$ is often unrealistic because of the artificiality of the laboratory environment. Combined with feedback from stream of commerce bags with threat items identified by IIOs, actual effectiveness ratings may be determined. Aggregated officer performance data can be analyzed to produce a measure of actual X-ray system performance, or Actual System Detection Rate ($A_d$) and Actual System False Alarm Rate ($A_{fa}$) for officers, checkpoints, airports, or an entire screening system. Currently, $A_d$ is approximated through extrapolation of low-rate red and blue team covert testing. $A_{fa}$ is not measurable. Analysis of actual enterprise threat detection based on actual aggregated officer performance according to embodiments of the invention is a significant improvement in measuring real-time security effectiveness across threat vectors and can be stratified by officer type, airport, region and other criteria.

In operation, a passenger may introduce property into transportation security system 400 by placing the property on property egress component 418. Property ingress component 418 may convey the property to imaging component 416, whereby the property is imaged, such as by X-ray or computed tomography (CT) imaging. The images captured by imaging component 416 are provided to data storage component 454, where they are at least temporarily stored. The image may be analyzed by image analysis component 453 and the annotations obtained through such analysis may be stored in data storage component 452. Multiplexing control component 452 retrieves the image (and the annotations associated therewith) from data storage component 452 and assigns it to a particular analyst 434. Multiplexing control component 452 may convey the image to a threat assessment component 436 at which the particular analyst 434 has logged on. Analyst 434 makes a threat decision, i.e., whether a threat exists in the property being scrutinized, which may be provided to alert and path select component 414. If analyst 434 determines that no threat exists in the property, the property may be conveyed by alert and path select component 414 to property egress component 412a, where it is returned to the passenger, for example. Upon a threat being detected, the subject passenger property may be conveyed to property egress component 412b, where a security officer 415 may verify whether a threat truly exists. If so, security officer 415 may provide an indication of such to operator assessment component 459, which may update an operator rating accordingly. If analyst 434 indicates a threat and it is determined by security officer 415 that none actual exists, this information too is used to update the operator rating of analyst 434. Such ratings may be stored in analyst profiles 454*d*.

In one embodiment, transportation terminal 410 is outfitted with a threat assessment component 417, by which threat decisions can be made locally with the assistance of centralized deep learning logic. Threat assessment component 417 may be configured similarly to threat assessment component 436, in which case threat decisions are made by an operator 413, or may be configured similarly to threat assessment component 455, in which case threat decisions are made by local machine operations. Local threat decisions may decrease the amount of image traffic in data transport component 460. In certain implementations, images are sent to analysis center 430 only when existence of a threat cannot be definitively established. That is, if a particular object is present in an image as determined locally by threat assessment component 417 (and/or by the corresponding operator 413 thereof), where that particular object represents a threat, but it cannot be determined to within a predetermined confidence level that the object being scrutinized is actually the particular threat object, then the image may be transferred to threat assessment component 436 for further analysis by operator 434. In certain cases, operator 434 may be more skilled than operator 413 or, in the case where threat assessment component 417 makes threat decisions by machine operations (without intervention by an operator 413), operator 434 may verify whether the particular object actually exists in the image.

In certain embodiments, threat assessment component 417, as well as threat assessment component 436, may avail itself of locally stored machine learning models 419 (and machine learning models 435 in the case of threat assessment component 436) to make threat decisions. In one implementation, the local machine learning models 419 and 435 are continually updated by data and control center 450. For example, deep learning logic 457 may train models 454*c* based on feedback on images system wide (as described above) and may periodically update local models 419 and 435 accordingly. Thus, local threat assessments are made with the benefit of image analysis conducted on system wide imagery.

As illustrated in FIG. 4, transportation security system 400 may include a threat injection lab 420 at which an explosives lab technician 422 may construct actual threat positive property, e.g., bombs, firearms, hand weapons, hazardous substances, etc. Such property may be imaged within the laboratory confines at imaging component 424 and the resulting image covertly inserted in the massive multiplexing process described above. In one implementation, the covert image may be provided to a single analyst 434 or deep learning logic 457. In another implementation, the image may be queued to all analysts 434 and evaluated by deep learning logic 457. The "threat" or "no threat" determination by analysts 434 or deep learning logic 457 may be captured to determine the detection rate for each officer, the deep learning algorithm driven process and the entire system. The test bags created at threat injection lab 420 may be continually and regularly inserted with a mixture of existing and emerging threat configurations based on the latest intelligence.

Figure 5:
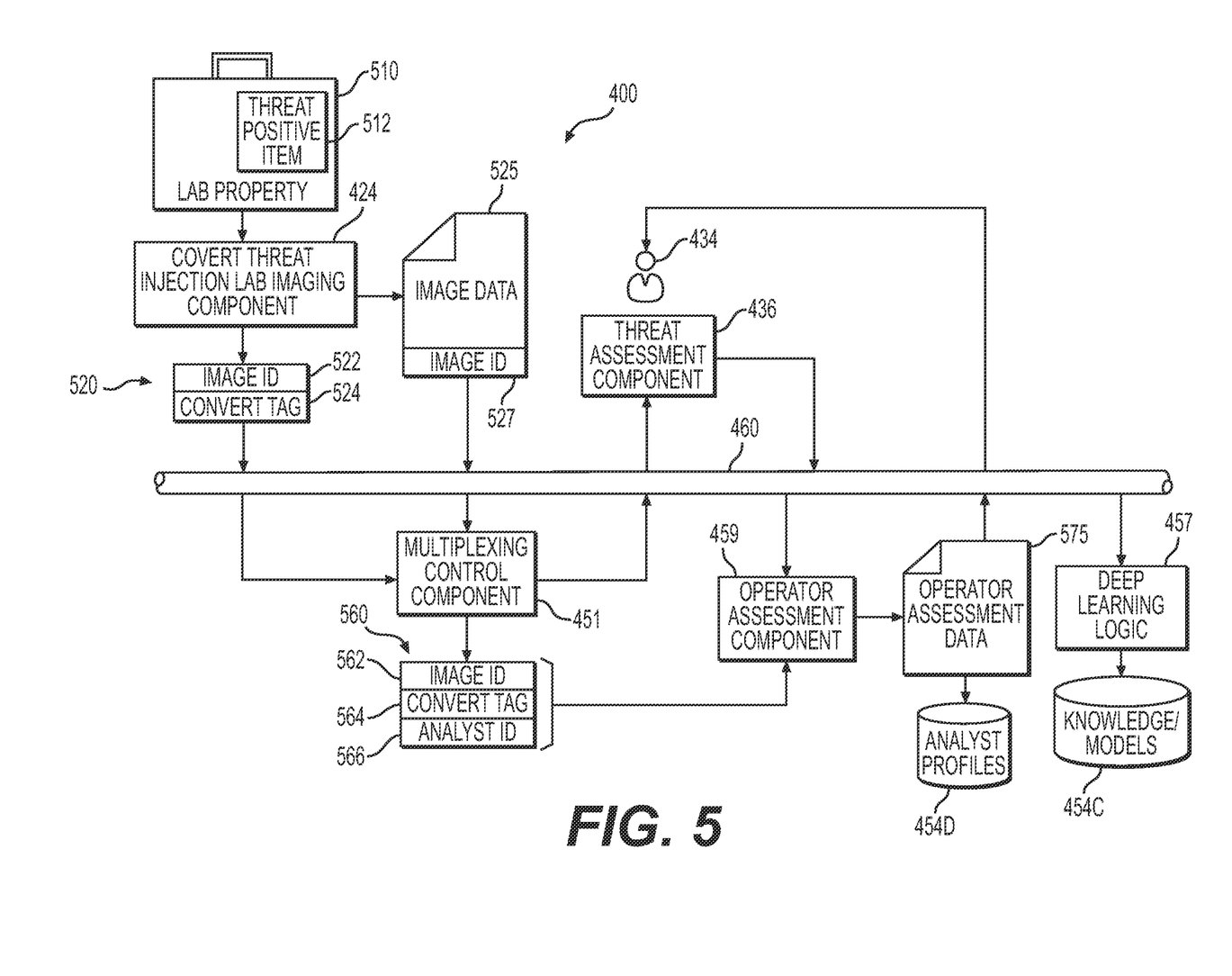
FIG. 5 is a schematic block diagram of features of the transportation security system illustrated in FIG. 4 that facilitate operator assessment and deep learning with which the present invention can be embodied.

FIG. 5 is a schematic block diagram of example transportation security system 400 showing those exemplary features that facilitate operator assessment and deep learning based on actual threats constructed at threat injection lab 420. As illustrated in the figure, lab property 510, e.g., a carry-on suitcase, may be outfitted with a threat positive item 512, such as a physical bomb disguised in an electronics device. The lab technician may image lab property 510 at convert threat injection lab imaging component 424 to generate an image 525. Image 525 may comprise image data 523 and an image identifier 527 that uniquely identifies the image. Additionally, covert threat injection lab imaging component 424 may create metadata 520, which may include an image identification field 522 and a covert tag field 524. Metadata 520 may be separate from image 525 for purposes of maintaining the covert nature of image 525 as it traverses system 400. That is, images generated by threat injection lab 420 should appear to analyst 434 as any other image in system 400 would. Metadata 520 may identify the image as being known threat positive, such as by information contained in covert tag 524. The covert lab technician may have special access rights to insert known threat positive images into system 400.

As illustrated in FIG. 5, metadata 520 may be provided to multiplexing control component 451 separate from image 525, whereby a decision is made as to which analyst 434 is to receive the image for analysis. Such decision may be made randomly, according to a training schedule or for other reasons. However, it is to be understood that in certain implementations, all analysts 434 may receive the threat positive image to determine which analysts 434 will identify the threat and which analysts 434 will not. Image 525 may be conveyed to the threat assessment component 436 at which the analyst 434 is logged on. Meanwhile, multiplexing control component 451 may generate metadata 560, which associates image 525, by way of image identifier 562, with covert tag 564 and the identifier 566 of the analyst to receive image 525. Metadata 560 may be provided to operator assessment component 459 so as to identify the operator being assessed, the image analyzed for the assessment and the fact that the image is threat positive as constructed at threat injection lab 420.

At threat assessment component 436, analyst 434 determines whether a threat exists and such determination may be provided to operator assessment component 459. As illustrated in the figure, operator assessment component 459 may be in possession of metadata 560, which identifies the image as threat positive, such as through data contained in covert tag 564. The determination of analyst 434 is compared to the known threat positive condition of image 525 and operator assessment data 575 may be generated indicating the results of the comparison. Operator assessment data 575 may be used to update the analyst profile 454*d* of the particular analyst 434 and may be fed back to the analyst 434 for purposes of training. Additionally, image 525 and metadata 520 may be provided to deep learning logic 457, whereby the image 525 may be used for training models 454*c*.

Figure 6:
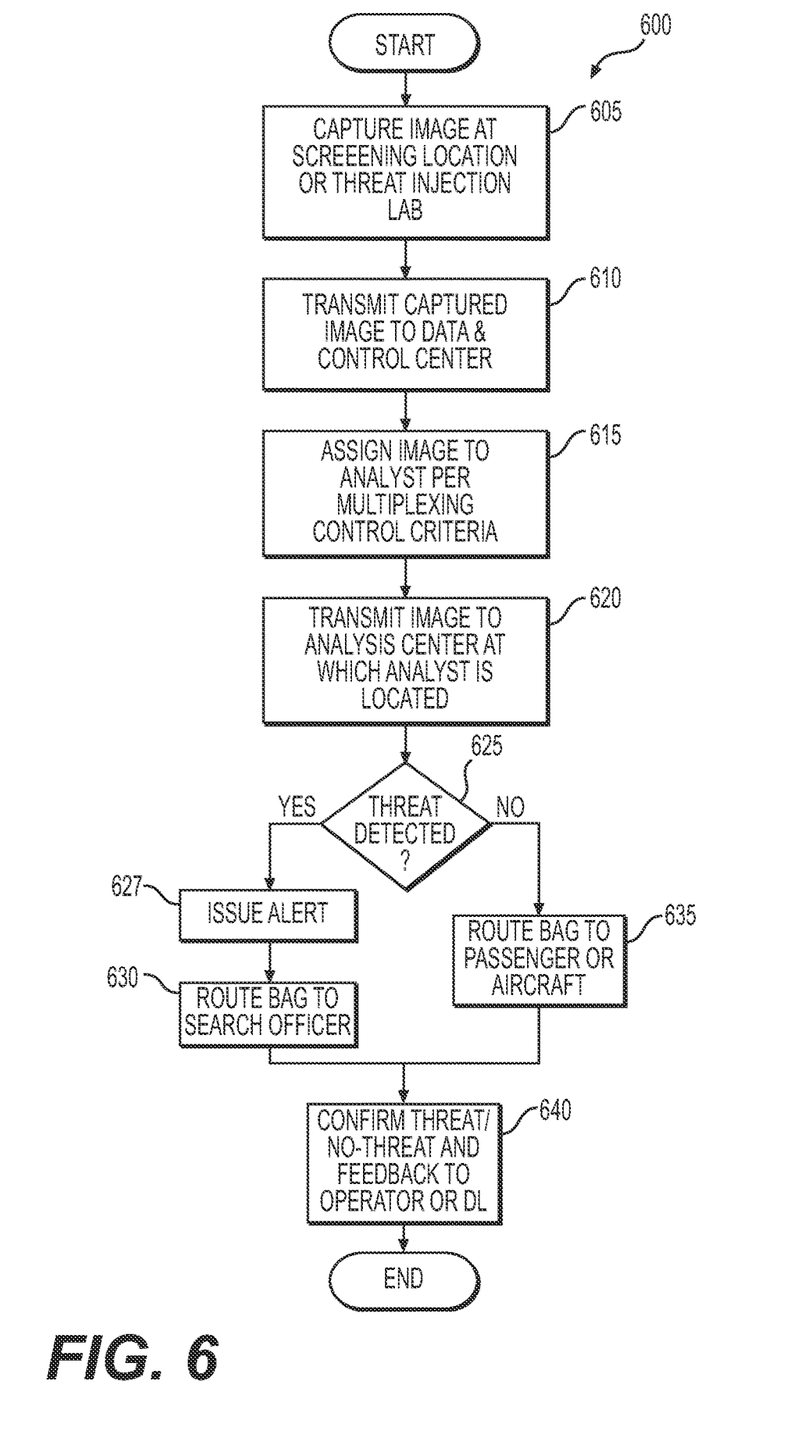
FIG. 6 is a flow diagram of a transportation security process by which the present invention can be embodied.

FIG. 6 is a flow diagram of a process 600 embodying the present invention. In operation 605, an image is captured of subject property, which may be at a transportation terminal or a threat injection lab. In operation 610, the captured image is conveyed to the data and control center at which, in operation 615, the image is assigned to an analyst (human operator or deep learning logic) per multiplexing control criteria. Such multiplexing control criteria may include that by which individual operators are assigned certain threat assessment tasks, by which load balancing may be achieved, by which network congestion can be ameliorated, by which network outages can be bypassed, by which operating scheduling, training and breaks can be accommodated, and so on. In operation 620, the image is transmitted to the analysis center at which the analyst (human operator or deep learning logic) is located. At the analysis center (or data and control center in the case of deep learning logic), the analyst makes a "threat" or "no-threat" determination. If the determination is "no-threat," as determined in operation 625, process 600 may transition to operation 635, whereby the subject property is routed without delay to the passenger (for carry-on bags) or aircraft (for checked bags). If the determination is "threat," process 600 may transition to operation 627, whereby an alert is issued at the screening location at which the threat condition is noted in the corresponding image. In operation 630, the subject property may be automatically routed to a bag search officer who will search for the suspected prohibited item(s). In operation 640, the bag search officer will notate "confirmed threat" or "confirmed no-threat" in the system depending on the result of the physical search and the notation may be used as feedback for purposes of personnel evaluation and/or for purposes of deep learning.

Embodiments of the present invention significantly increase threat detection in accessible baggage; significantly decrease manpower requirements; significantly reduce costs; allow for the removal of liquids restrictions; allow integration with customs and provide much greater capability for detection in customs; increase passenger throughput at the checkpoint; and reduce checkpoint foot print size.

The system may include additional servers, clients, and other devices not shown, and individual components of the system may occur either singly or in multiples, or for example, the functionality of various components may be combined into a single device or split among multiple devices. It is understood that any of the various components of the system may be local to one another, or may be remote from and in communication with one or more other components via any suitable means, for example a network such as a WAN, a LAN, Internet, Intranet, mobile wireless, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or any other procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C++, Java, P1/1, Fortran or other programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Embodiments of the present invention may include, without being limited to, the following.

A transportation security apparatus comprising: a memory; and a processor configured to: store, in the memory, images received from image capturing equipment deployed at respective screening nodes, the screening nodes being communicatively coupled to the processor through a communications network; analyze the stored images using a machine learning model to identify objects therein, where the presence of a particular such object in an image is indicative of a threat condition at the screening node at which the image was captured; transmit the analyzed images to threat assessment components in accordance with operator selection criteria, the threat assessment components being communicatively coupled to the processor through the communications network; receive, from the threat assessment components, an indication that the particular object is observed in the image; transmit an indication that the particular object is observed in the image to the screening node at which the image was captured in response to receiving the indication that the particular object is observed in the image; receive an indication of whether the particular object is present at the screening node; and train the machine learning model based on the received indication of whether the particular object is observed in the image.

The apparatus above, wherein the processor is further configured to: apply the machine learning model to the images to determine whether the particular object is depicted therein; and transmit an indication that the particular object is depicted in the image to one of the screening nodes at which the image was captured in response to the determination that the particular object is depicted in the image according to the machine learning model.

The apparatus above, wherein the processor is further configured to: receive a threat-positive image depicting the particular object from a covert node and store the threat-positive image in the memory, the covert node being communicatively coupled to the processor through the communications network; transmit the threat-positive image to the threat assessment components in accordance with other operator selection criteria; receive an indication from the threat assessment components of the presence or absence of the particular object in the threat-positive image; and compute a rating for human operators at the respective threat assessment components to which the threat-positive image was transmitted based on the indication of the presence or absence of the particular object in the image.

The apparatus above, wherein the processor is further configured to train the machine learning model based on the received indication of whether the particular object is observed in the threat-positive image.

The apparatus above, wherein the processor is further configured to store the rating for the human operators in the memory under respective analyst profiles.

A transportation security system comprising: a set of screening node devices, each having image capturing equipment deployed thereat by which image data are generated, the image data comprising individual images of objects passing through the image capturing equipment, where the presence of a particular such object at any of the set of screening node devices manifests a threat condition at that screening node device; a set of image interpretation node devices, each having a threat assessment component deployed thereat at which is determined whether the particular object is depicted in the image data generated at each of the screening node devices; and a central node device communicatively coupled to the screening node devices and the image interpretation node devices through a telecommunications network, the central node device comprising: a memory; and a processor configured to: receive the image data from the image capturing equipment deployed at the screening node devices and store the received image data in the memory; analyze the stored images using a machine learning model to identify objects therein; transmit the analyzed image data to each of the threat assessment components deployed at the image interpretation node devices in accordance with operator selection criteria; receive from the threat assessment components an indication of the presence or absence of the particular object in the image data; transmit an indication that the condition exists to the screening node device at which the particular objects are present according to the image data; and train the machine learning model based on a verification that the condition exists at the screening node device.

The system above further comprising a covert node device at a facility at which the particular object is positioned, the covert node device including image capturing equipment by which an image of the particular object is generated.

The system above, wherein the processor at the central node device is further configured to: receive threat-positive image data depicting the particular object from the image capturing equipment at the covert node device and store the received threat-positive image data in the memory; transmit the threat-positive image data to the threat assessment components deployed at the image interpretation node devices in accordance with other operator selection criteria; receive an indication from the threat assessment components of the presence or absence of the particular object in the threat-positive image data; and compute a rating for a human operator at the threat assessment component to which the threat-positive image was transmitted based on the indication of the presence or absence of the particular objects in the threat-positive image data.

The system above, wherein the processor at the central node device is further configured to receive a verification that the particular object is present or absent at the screening node device for which the indication that the condition exists was determined at a corresponding threat assessment component; and compute a detection rating for a human operator at the threat assessment component from which the verification was received.

The system above, wherein the processor at the central node device is further configured to: receive verifications that the particular object is present or absent at the screening node devices; and compute a rating for the system based on the verifications.

The system above, wherein the processor at the central node device is further configured to: apply the machine learning model to the image data to determine whether the image of the particular object exists therein; and transmit the indication that the condition exists to the screening node device at which the particular object is present according to the machine learning model applied to the image data.

A method comprising: storing, in a memory, images received from image capturing equipment deployed at respective screening nodes, the screening nodes being communicatively coupled to the processor through a communications network; analyzing the stored images using a machine learning model to identify objects therein, where the presence of a particular such object in an image is indicative of a threat condition at the screening node at which the image was captured; transmitting the analyzed images to threat assessment components in accordance with operator selection criteria, the threat assessment components being communicatively coupled to the processor through the communications network; receiving, from the threat assessment components, an indication that the particular object is observed in the image; transmitting an indication that the particular object is observed in the image to the screening node at which the image was captured in response to receiving the indication that the particular object is observed in the image; receiving an indication of whether the particular object is present at the screening node; and training the machine learning model based on the received indication of whether the particular object is observed in the image.

The method above further comprising: applying the machine learning model to the images to determine whether the particular object is depicted therein; and transmitting an indication that the particular object is depicted in the image to one of the screening nodes at which the image was captured in response to the determination that the particular object is depicted in the image according to the machine learning model.

The method above further comprising: receiving a threat-positive image depicting the particular object from a covert node and store the threat-positive image in the memory, the covert node being communicatively coupled to the processor through the communications network; transmitting the threat-positive image to the threat assessment components in accordance with other operator selection criteria; receiving an indication from the threat assessment components of the presence or absence of the particular object in the threat-positive image; and computing a rating for human operators at the respective threat assessment components to which the threat-positive image was transmitted based on the indication of the presence or absence of the particular object in the image.

The method above further comprising training the machine learning model based on the received indication of whether the particular object is observed in the threat-positive image.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A method, comprising:
receiving a first set of images from image capturing equipment deployed at respective screening nodes located at one or more airports;
receiving a second set of images from a covert node, which generates the second set of images under controlled conditions at a non-airport facility, the second set of images includes at least one of a threat-positive test image depicting objects indicative of threat conditions or a threat-negative test image void of objects indicative of threat conditions;
utilizing a threat detection model to evaluate an image from the first set or the second set to determine whether a particular object is depicted in the image, the particular object being indicative of a threat condition;
transmitting the image from the first set or the second set to one or more threat assessment components in accordance with operator selection criteria;
receiving, from a threat assessment component, an indication that the particular object is observed or not observed in the image; and
determining whether the image includes the particular object based on at least the indication from the threat assessment component or a result from the threat detection model.

2. The method of claim 1, wherein the image originates from a screening node, and wherein the method further comprises transmitting an indication that the particular object is present or absent in the image to the screening node at which the image was captured, and
when an indication that the particular object is present in the image transmitted to the screening node, the indication further includes a command to route property associated with the image to a security officer for verification, and the method further includes:
receiving an indication of whether the particular object is verified in the property at the screening node; and
at least one of:
computing a rating for a human operator at the threat assessment component to which the image was transmitted based on the indication received from the screening node; or
determining an effectiveness of the threat detection model based on the result of the threat detection model.

3. The method of claim 2, further comprising training a model based on the indication of whether the particular object is verified in the property at the screening node, wherein the model is one of the threat detection model or another model.

4. The method of claim 1, wherein the image is a threat-positive image or a threat-negative image from the covert node, and wherein the method further comprises at least one of:
computing a rating for a human operator at the threat assessment component to which the image was transmitted based on the indication received from the threat assessment component; or
determining an effectiveness of the threat detection model based on the result of the threat detection model.

5. The method of claim 1, further comprises training a model based on the second set of images, wherein the model is one of the threat detection model or another model.

6. The method of claim 1, further comprising verifying whether the particular object is present or absent in the image before utilizing the image to train a model, wherein the model is at least one of the threat detection model or another model.

7. The method of claim 1, further comprising training a model based on the indication that the particular object is observed or not observed in the image received from the threat assessment component, wherein the model is one of the threat detection model or another model.

8. The method of claim 1, wherein the threat detection model is deployed on one or more of a screening node, a threat assessment component, or a central node device, and
wherein the screening node or the covert node transmits the image from the first set or the second set to the one or more threat assessment components.

9. A transportation security apparatus, comprising:
a memory; and
a processor coupled to the memory and configured to:
receive a result from a threat detection model that evaluates an image from a first set of images or a second set of images to determine whether a particular object is depicted in the image, the particular object being indicative of a threat condition;
receive, from a threat assessment component selected from one or more threat assessment components in accordance with operator selection criteria, an indication that the particular object is observed or not observed in the image; and
determine whether the image includes the particular object based on at least the indication from the threat assessment component or a result from the threat detection model,
wherein the first set of images includes images from image capturing equipment deployed at respective screening nodes located at one or more airports, and
wherein the second set of images include images from a covert node, which generates the second set of images under controlled conditions at a non-airport facility, the second set of images includes at least one of a threat-positive test image depicting objects indicative of threat conditions or a threat-negative test image void of objects indicative of threat conditions.

10. The transportation security apparatus of claim 9, wherein the image originates from a screening node, and wherein the processor is further configured to transmit an indication that the particular object is present or absent in the image to the screening node at which the image was captured.

11. The transportation security apparatus of claim 9, wherein the image is a threat-positive image or a threat-negative image from the covert node, and wherein the processor is further configured to at least one of:
compute a rating for a human operator at the threat assessment component to which the image was transmitted based on the indication received from the threat assessment component; or
determine an effectiveness of the threat detection model based on the result of the threat detection model.

12. The transportation security apparatus of claim 9, wherein the processor is further configured to train a model based on the second set of images, wherein the model is one of the threat detection model or another model.

13. The transportation security apparatus of claim 10, wherein an indication that the particular object is present in the image transmitted to the screening node includes a command to route property associated with the image to a security officer for verification, and wherein the processor is further configured to:
  receive an indication of whether the particular object is verified in the property at the screening node; and at least one of:
  compute a rating for a human operator at the threat assessment component to which the image was transmitted based on the indication received from the screening node; or
  determine an effectiveness of the threat detection model based on the result of the threat detection model.

14. The transportation security apparatus of claim 13, wherein the processor is further configured to train a model based on the indication of whether the particular object is verified in the property at the screening node, wherein the model is one of the threat detection model or another model.

15. The transportation security apparatus of claim 9, wherein the processor is further configured to obtain verification whether the particular object is present or absent in the image before utilizing the image to train a model, wherein the model is one of the threat detection model or another model.

16. The transportation security apparatus of claim 10, wherein an indication that the particular object is absent in the image transmitted to the screening node includes a command to route property associated with the image back to a passenger.

17. The transportation security apparatus of claim 9, wherein the processor is further configured to train a model based on the indication that the particular object is observed or not observed in the image received from the threat assessment component, wherein the model is one of the threat detection model or another model.

18. The transportation security apparatus of claim 9, wherein the transportation security apparatus is one or more of a screening node, a threat assessment component, or a central node device, and
  wherein the threat detection model is deployed on one or more of the transportation security apparatus, a threat assessment component, a screening node, or a central node device.

19. A transportation security system, comprising:
  a set of screening node devices located at one or more airports, each having image capturing equipment deployed thereat by which image data are generated, the image data comprising individual images of objects passing through the image capturing equipment, wherein presence of a particular object at any of the set of screening node devices manifests a threat condition at that screening node device;
  a set of image interpretation node devices, each having a threat assessment component deployed thereat at which is determined whether the particular object is depicted in the image data generated at each of the screening node devices;
  a covert node device that generates at least one of a threat-positive test image that depicts an object indicative of a threat condition or a threat-negative test image, the covert node device located at a non-airport facility under controlled conditions; and
  a processor coupled to the memory and configured to:
    receive a first set of images from the set of screening nodes;
    receive a second set of images from the covert node device;
    receive a result from a threat detection model that evaluates an image from the first set or the second set to determine whether a particular object is depicted in the image, the particular object being indicative of a threat condition;
    receive, from a threat assessment component selected from one or more threat assessment components in accordance with operator selection criteria, an indication that the particular object is observed or not observed in the image;
    determine whether the image includes the particular object based on at least the indication from the threat assessment component or a result from the threat detection model.

20. The transportation security system of claim 19, wherein the processor is included in one or more of a screening node device, an image interpretation node device, or a central node device, and
  wherein the set of screening node devices, the set of image interpretation node devices, and the covert node device are communicatively coupled through a telecommunications network.

* * * * *